Figure 1:
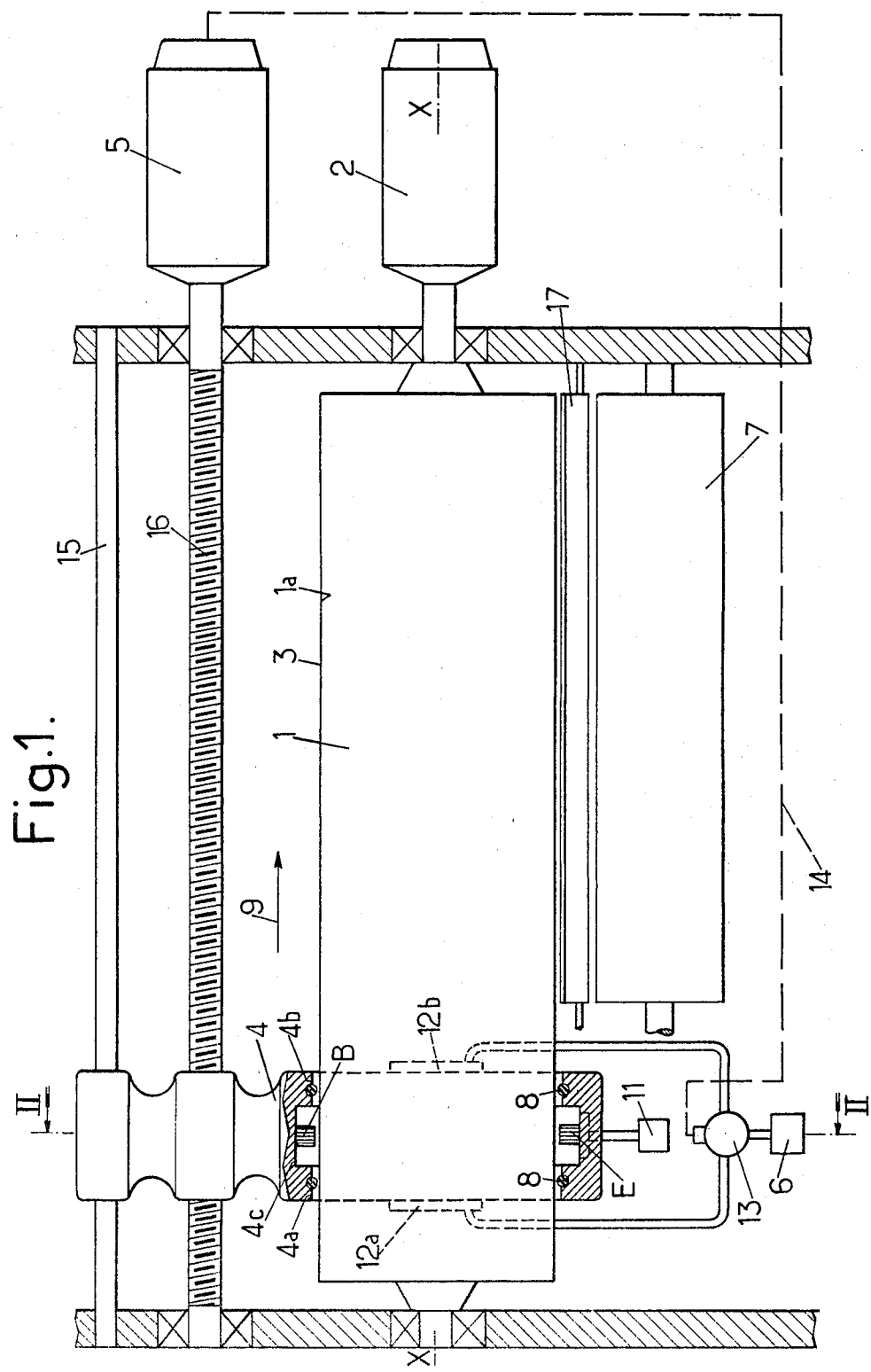

United States Patent [19]

Dol et al.

[11] 4,379,302
[45] Apr. 5, 1983

[54] POWDERED MAGNETIC INK PRINTING DEVICES

[75] Inventors: Christian Dol, Gif sur Yvette; Jean-Yves Valet, Beauchamp, both of France

[73] Assignee: Societe D'Applications Generales D'Elect., Paris, France

[21] Appl. No.: 171,099

[22] Filed: Jul. 22, 1980

[30] Foreign Application Priority Data

Jul. 24, 1979 [FR] France ................... 79 19113

[51] Int. Cl.³ .................. G03G 19/00; G01P 15/06
[52] U.S. Cl. ................... 346/74.2; 346/74.5
[58] Field of Search ............. 346/74.2, 74.5; 358/301; 360/70, 81, 84; 118/653, 654, 659; 427/47, 48; 101/DIG. 5

[56] References Cited

U.S. PATENT DOCUMENTS

| | | | |
|---|---|---|---|
| 4,072,957 | 2/1978 | Kokaji et al. | 346/74.2 |
| 4,135,194 | 1/1979 | Frey | 346/74.5 |
| 4,146,898 | 3/1979 | Nelson | 346/74.2 |
| 4,255,767 | 3/1981 | Frey | 346/74.2 X |

*Primary Examiner*—Aristotelis M. Psitos

*Attorney, Agent, or Firm*—Larson and Taylor

[57] ABSTRACT

The invention relates to a printing device comprising: a travelling surface, for example the surface of a drum, driven in rotation by the action of first motor means, said travelling surface supporting a thin magnetic layer; a scanning support driven with a step-by-step reciprocal movement, perpendicular to the movement of the travelling surface of said drum, by the action of second motor means, said scanning support supporting at least one group of integrated magnetic induction heads, this group of heads being connected to sequential control means; powdered magnetic ink supply means; ordinary paper supply means; said scanning support having an annular shape surrounding the travelling surface of the drum over a considerable part at least of its circumferential extent; said scanning support comprising two lateral parts surrounding a central part; said lateral parts being arranged to create a seal between themselves and said travelling surface of said drum; said central part supporting one, or preferably more, groups of integrated magnetic induction heads; a compressed gas supply device connected to said central part; said powdered magnetic ink supply means being connected to the outside of said scanning support.

8 Claims, 2 Drawing Figures

POWDERED MAGNETIC INK PRINTING DEVICES

The invention relates to printing devices of the kind using magnetic printing, caused by the action of magnetic induction heads on a thin magnetic layer, and visible printing obtained by inking the magnetic printing by means of a powdered solid magnetic ink and transferring this inking, by contact, to a sheet of ordinary paper placed against this thin layer.

So that such printing devices may be manufactured at an acceptable cost price to be employed in widely-used apparatus (for example, in telecopiers or computer terminals), it is advantageous to have recourse to magnetic induction heads of the "integrated" type.

Such integrated magnetic induction heads are obtained by vacuum deposition on appropriate substrates and are at present used in disk memory devices where they provide for recording of the disks and reading same. These integrated magnetic induction heads are in particular mounted on the disk memory devices commercialized by the applicant under the name MS 500.

These integrated magnetic induction heads may be assembled in groups, for example twenty heads, the spacing between heads being able to be reduced to 0.125 mm, which gives eight heads per millimeter, so eight magnetic impressions and eight visible impressions.

However, the life-span of these integrated magnetic induction heads depends essentially on the cleanliness of the atmosphere in which these heads work. In particular, these heads are subjected to rapid wear when dust particles settle between their surface and the layer is to be magnetically printed.

Furthermore, the magnetic ink particles may cause very rapid wear of the integrated magnetic induction heads.

Now, it will be readily understood that, if it is desired to construct a rapid printing device (which may be contemplated since magnetic printing is carried out at the scale of a microsecond), it is advantageous to have available a powdered magnetic ink source the particles of which are perfectly free to cover very rapidly the magnetic impression. Furthermore, the aim is to construct a compact printing device and the powdered magnetic ink source will have to be close to the magnetic printing station, so close to the heads.

If special precautions are not taken, there is then a risk of the magnetic induction heads being in an environment where there are present, in a large number, particules of magnetic ink, and the life-span of these heads will be abnormally short.

The invention has precisely as its aim to remedy this disadvantage.

To this end, the printing device comprises a traveling surface, for example the surface of a drum rotated by the action of first motor means, said drum having, on its surface, a thin magnetic layer; a scanning support driven with a reciprocal step-by-step movement, perpendicular to the traveling movement of the surface of the drum, by the action of second motor means, said scanning support supporting at least one group of integrated magnetic induction heads, this group of heads being connected to sequential control means; powdered magnetic ink supply means; and ordinary paper supply means; and it is characterized by the fact that the scanning support has an annular shape surrounding the traveling surface of the drum over a considerable part at least of its circumferential extent, this scanning support comprising two lateral parts surrounding a central part, the two lateral parts being arranged to create a seal between themselves and the traveling surface of the drum; by the fact that the central part supports one or, preferably, several groups of integrated magnetic induction heads; by the fact that compressed gas supply means open into this central part; and by the fact that powdered magnetic ink supply means open outside the scanning support.

According to an advantageous embodiment of the invention, the powdered ink supply means comprise two distribution ramps disposed respectively on the outer sides of the two lateral parts of the scanning support, distribution means being provided for supplying with ink one or other of the two said ramps in the direction of the reciprocal movement of the scanning support.

The invention consists, apart from the arrangements which have just been mentioned, of certain other arrangements which are used preferably at the same time and which will be more explicity discussed hereafter.

The invention will, in any case, be well understood with the help of the complement of description which follows, and the accompanying drawings, which complement and drawings are relative to a preferred embodiment of the invention and comprise, of course, no limiting character.

FIG. 1 of these drawings shows, in a schematical section, a printing device constructed in accordance with the invention.

Figure 2:
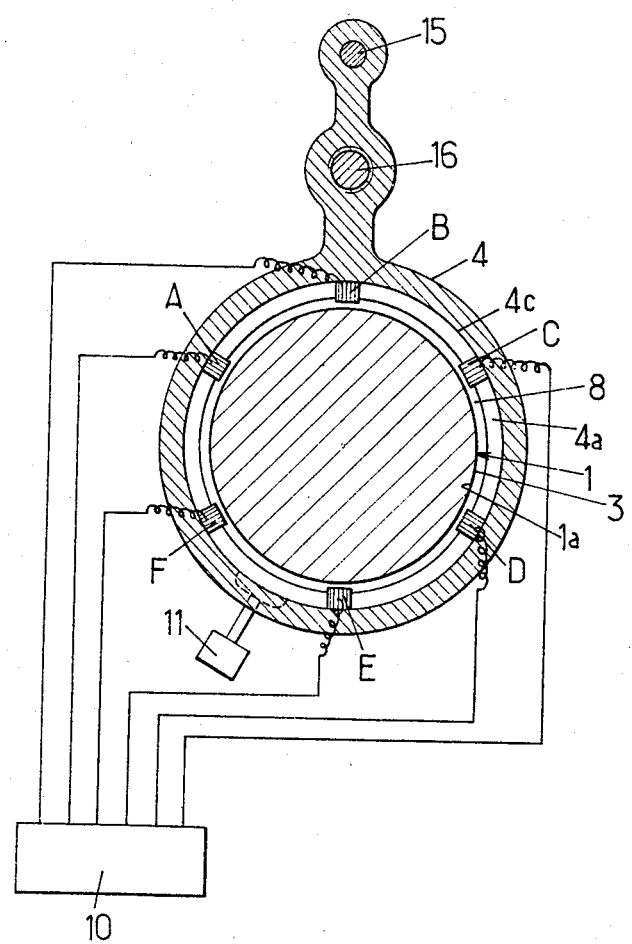

FIG. 2 is a section along II—II of FIG. 1.

In FIGS. 1 and 2 there is shown a printing device which comprises a traveling surface 1 which may advantageously be formed by a cylindrical roller rotating about an axis XX under the action of first motor means 2. It should however be noted that such a traveling surface could be formed by an endless band passing over a plurality of rollers having parallel axes.

The traveling surface of this drum 1 carries a thin magnetic layer 3.

A scanning support 4 is provided for cooperating with traveling surface 1; this scanning support 4 is driven with a reciprocal step-by-step movement, perpendicular to the movement of the traveling surface of drum 1. For this purpose, second motor means 5 are provided.

Scanning support 4 carries several groups of integrated magnetic induction heads A, B, C, D . . . , each group being able to comprise twenty heads.

Supply means, designated generally by the reference 6, are provided for supplying powdered magnetic ink.

Supply means, designated generally by the reference 7, are provided for supplying the traveling surface of drum 1 with ordinary paper.

Scanning support 4 has an annular shape surrounding traveling surface 1 and it comprises two lateral parts $4_a$ and $4_b$ surrounding a central part $4_c$.

These two lateral parts $4_a$ and $4_b$ are arranged to create a seal between themselves and the surface $1_a$ of rotating drum 1.

For this purpose, each lateral part $4_a$ and $4_b$ may comprise at least one seal 8, preferably of the labyrinth type.

This central part $4_c$ carries the group of integrated magnetic induction heads A, B, C, D . . . which are evenly spaced apart over a circumference of the inner surface of said central part $4_c$.

There may be provided, for example, three groups of heads at 120°, four groups of heads at 90°, six groups of heads at 60°, etc.

In FIGS. 1 and 2 there is shown an embodiment in which six groups of heads are disposed at 60°, i.e. the groups A, B, C, D, E, F.

The operation is then the following: when the traveling surface of drum 1 has effected a sixth of a revolution, a circumferential strip of twenty magnetic points covering a width of 2.5 mm (each group of heads comprising twenty heads spaced apart by 0.125 mm) will have been printed magnetically; scanning support 4 will then advance by a step of 2.5 mm in the direction of arrow 9 of FIG. 1, while the traveling surface of drum 1 will effect a rotation of two-sixths of a revolution; then, the magnetic printing will be carried out on another sixth of a revolution, and then scanning support 4 will be again moved; and so on until complete magnetic printing of the magnetic layer 3 of surface $1_a$ of rotating drum 1 has been obtained.

If it is desired to print visibly on a sheet of ordinary paper of normal format A4, the traveling surface of drum 1 will have a circumferential length of at least 297 mm.

By controlling the groups of heads A, B, C, D, E, F, simultaneously, the magnetic printing is effected over a strip 2.5 mm wide and 297 mm long in the first sixth of a revolution of the traveling surface of drum 1; then, it is the second sixth of a revolution which will be magnetically printed, then the third sixth of a revolution: it will then be possible to advance scanning support 4 by a step of 2.5 mm. Then, so as to maintain the alignment along the width of format A4, it will be necessary to supply the group of heads D (diametrically opposite the group of heads A) with the magnetic pulses corresponding to the beginning of the following strip; then, either the group of heads A will be energized, or the next step will be begun.

In other words, if a line-by-line disposition is required along the width of the format A4, each line is divided into successive lengths of 2.5 mm which will be magnetically printed from one step to the next by diametrically opposed groups of heads on scanning support 4.

One of the advantages of the printing device of the invention is that it allows magnetic printing which is carried out at the scale of a microsecond whereas direct visible printing (matrix impression in electromechanical printing devices) is effected on the scale of a millisecond. It will then be possible to have a much longer time for advancing by one step, which was not the case in the matrix-impression printing devices.

With the arrangement described above, in which the groups of heads A, B, C, D, E, F are controlled by a circular permutation at a pitch of 3 (i.e. one group, then the diametrically opposite group), the ratio between the "advance time" and the "printing time" may be equal to 2 and the printing is effected for each sixth of a revolution of the traveling surface of drum 1.

However, if the groups of heads A, B, C, D, F are controlled by a circular permutation with a pitch of 4, or a pitch of 5, the ratio $$\frac{\text{advance time}}{\text{printing time}}$$

may be equal to 3 or 4 and so on.

It can be then seen that by varying the number of groups of heads A, B, C, D, E, F, . . . and their sequential control means, designated generally by the reference 10, it will be possible to choose the rotational speed of the traveling surface of drum 1 and the rate of step-by-step advance of scanning support 4. Since the stationary time at the step where the magnetic printing is carried out is very reduced, this step-by-step advance rate of scanning support 4 will moreover be a practically continuous advance.

This being so, supply means are provided, designated generally by the reference 11, for supplying the central part $4_c$ of scanning support 4 with compressed gas whose pressure is greater than the ambient pressure.

Furthermore, powdered magnetic ink supply means 7 are arranged so that they emerge outside scanning support 4.

With this arrangement, the atmosphere of the central part $4_c$ of scanning support 4, in which are located the groups of heads A, B, C, D, E, F, is always under an overpressure with respect to the ambient atmosphere surrounding scanning support 4 and, for this reason, it is impossible for the different dust particles, and more particularly for magnetic ink particles, to penetrate into this central part $4_c$.

The powdered magnetic ink supply means 7 emerge advantageously into two distribution ramps $12_a$ and $12_b$ coupled respectively to the two lateral parts $4_a$ and $4_b$ of scanning support 4, and a distributor 13 being provided for supplying successively distribution ramp $12_a$ and distribution ramp $12_b$ depending on the direction of the reciprocal movement of scanning support 4. When scanning support 4 moves in the direction of arrow 9, it is distribution ramp $12_a$ which is supplied with powdered magnetic ink and, in the opposite direction, it is distribution ramp $12_b$ which is supplied.

Distributor 13 may then be controlled by a connection 14 connected to the second motor means 5.

As far as scanning support 4 is concerned, it may be guided by one or more slides 15 and actuated by a worm 16, itself driven by the second motor means 5.

By way of example, there will be described the characteristics of a printing device constructed in accordance with the invention and designed for a telecopier printer whose printing capacity is 12,000 lines of format A4 per minute, i.e. four A4 formats per second.

The traveling surface of the drum rotates at 3000 rpm and has a diameter of 200 mm and a length of 300 mm. It may then print two A4 formats per revolution.

Scanning support 4 is equipped with twelve groups of heads with a ratio $$\frac{\text{advance time}}{\text{printing time}}$$

equal to 2.

The first motor means 2 are formed by a DC motor, regulated by a tachymetric generator.

Scanning support 4 is driven by worm 16 which is formed by a reversible ball screw. This screw is driven by the second motor means 5 at the rate of 400 steps of 2.5 mm per second by a DC current motor having a circular position sensor.

When scanning support 4 has traveled a width of 210 mm in 210 milliseconds, the whole of the magnetic layer 3 of surface $1_a$ of rotating drum 1 is printed magnetically and inking is simultaneously carried out by means of powdered magnetic ink supplied by distribution ramps $12_a$ or $12_b$.

The overpressure maintained in the central part $4_c$ of scanning support 4 avoids any fouling up of the magnetic printing zone where the groups of heads A, B, C, D . . . are located.

Then, calendering, i.e. elimination of the surplus magnetic ink particles, is effected by a suction flap 17.

Then, ordinary paper is fed, by paper supply means 6, against traveling surface $1_a$ of drum 1 whose rotational speed is then slowed down to 400 rmp in 60 milliseconds.

The cycle may then begin again.

Finally, and whatever the embodiment adopted, the printing device in accordance with the invention presents, among others, the following advantages:
- a long life-span for the integrated magnetic induction heads,
- absence of maintenance,
- high printing speed,
- reduced constructional cost,
- compact construction.

As is evident, and as it follows moreover from what has gone before, the invention is in no wise limited to those of its modes of application and embodiments which have been more specially considered; it embraces, on the contrary, all variations thereof.

We claim:

1. A printing device comprising: a travelling surface, for example the surface of a drum, driven in rotation by the action of first motor means, said traveling surface supporting a thin magnetic layer; a scanning support driven with a step-by-step reciprocal movement, perpendicular to the movement of the travelling surface of said drum, by the action of second motor means, said scanning support supporting at least one group of integrated magnetic induction heads, this group of heads being connected to sequential control means; powdered magnetic ink supply means; ordinary paper supply means; said scanning support having an annular shape surrounding the travelling surface of the drum over a considerable part at least of its circumferential extent; said scanning support comprising two lateral parts surrounding a central part; said lateral parts being arranged to create a seal between themselves and said travelling surface of said drum; said central part supporting one, or preferably more, groups of integrated magnetic induction heads; a compressed gas supply device connected to said central part; said powdered magnetic ink supply means being connected to the outside of said scanning support.

2. The printing device as claimed in claim 1, wherein said powdered ink supply means comprise two distribution ramps disposed respectively on the outer sides of the two lateral parts of the scanning support, distribution means being provided for supplying with ink one or other of the two said ramps depending on the direction of the reciprocal movement of said scanning support.

3. The printing device as claimed in claim 2, wherein the distribution means are controlled by a connection connected to the second motor means.

4. The printing device as claimed in any one of claims 1 to 3, wherein the travelling surface is cylindrical.

5. The printing device as claimed in claim 1, wherein each lateral part of said scanning support comprises at least one seal.

6. The printing device as claimed in claim 1, wherein the central part of said scanning support comprises several groups of integrated magnetic induction heads which are evenly spaced apart over a circumference of the internal surface of said central part.

7. The printing device as claimed in claim 6, wherein the groups of integrated magnetic induction heads are controlled simultaneously.

8. The printing device as claimed in claim 6, wherein the groups of integrated magnetic induction heads are controlled by circular permutation.

* * * * *